United States Patent [19]

Ukai et al.

[11] Patent Number: 5,042,916

[45] Date of Patent: Aug. 27, 1991

[54] ACTIVE MATRIX DISPLAY DEVICE HAVING DIVIDED ADDITIONAL CAPACITORS

[75] Inventors: Yasuhiro Ukai, Kobe; Tomihisa Sunata, Miki; Teizo Yukawa; Masaru Yasui, both of Kobe, all of Japan

[73] Assignee: Hosiden Corporation, Osaka, Japan

[21] Appl. No.: 592,272

[22] Filed: Oct. 3, 1990

[30] Foreign Application Priority Data

Oct. 4, 1989 [JP] Japan .................. 1-259537
Dec. 25, 1989 [JP] Japan .................. 1-335537

[51] Int. Cl.$^5$ ............................................ G02F 1/133
[52] U.S. Cl. ........................................ 359/59; 359/79; 359/89; 357/23.7
[58] Field of Search ............... 350/330, 332, 333, 334, 350/336, 339 R; 340/719, 784; 428/1; 357/23.7, 45, 23.6, 51; 219/121.63

[56] References Cited

U.S. PATENT DOCUMENTS 4,761,058  8/1988  Okubo et al. .................. 350/333
4,762,398  8/1988  Yasui et al. ................... 350/334
4,983,022  1/1991  Shannon ...................... 350/334

FOREIGN PATENT DOCUMENTS 0112700  7/1984  European Pat. Off. ........... 340/784
0239531  9/1989  Japan ......................... 340/784
1-283519 11/1989  Japan ......................... 340/784

Primary Examiner—Stanley D. Miller
Assistant Examiner—Tai V. Duong
Attorney, Agent, or Firm—Pollock, VandeSande and Priddy

[57] ABSTRACT

One end portion of each pixel electrode is extended under a gate insulating film underlying the neighboring gate bus and defines an additional capacitance region. The extended portion of the pixel electrode is divided into a plurality of comb-tooth-like electrodes, each defining divided additional capacitors. One of the comb-tooth-like electrodes is separated by a gap from the pixel electrode, and first and second electrodes for laser welding use are formed on the comb-tooth-like electrode and the pixel electrode facing each other across the gap. The first and second electrodes form series-connected first and second capacitances for laser welding use between them and a third electrode for laser welding use formed above them with a gate insulating film interposed therebetween. When one of the divided additional capacitors connected to the pixel electrode is bad in insulation, the defective one of the divided additional capacitors is cut off and the first and second capacitances are caused to short by welding, whereby the total additional capacitance can be held substantially constant.

5 Claims, 8 Drawing Sheets

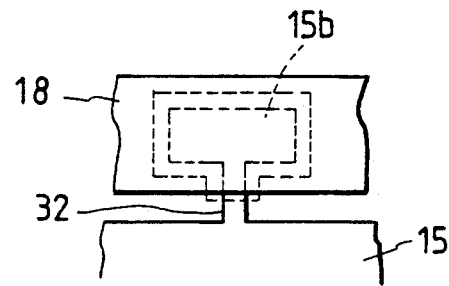
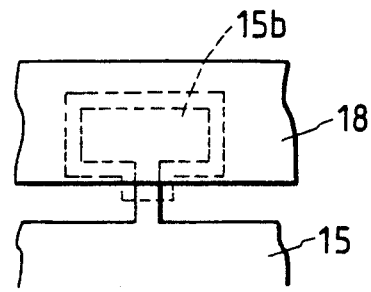
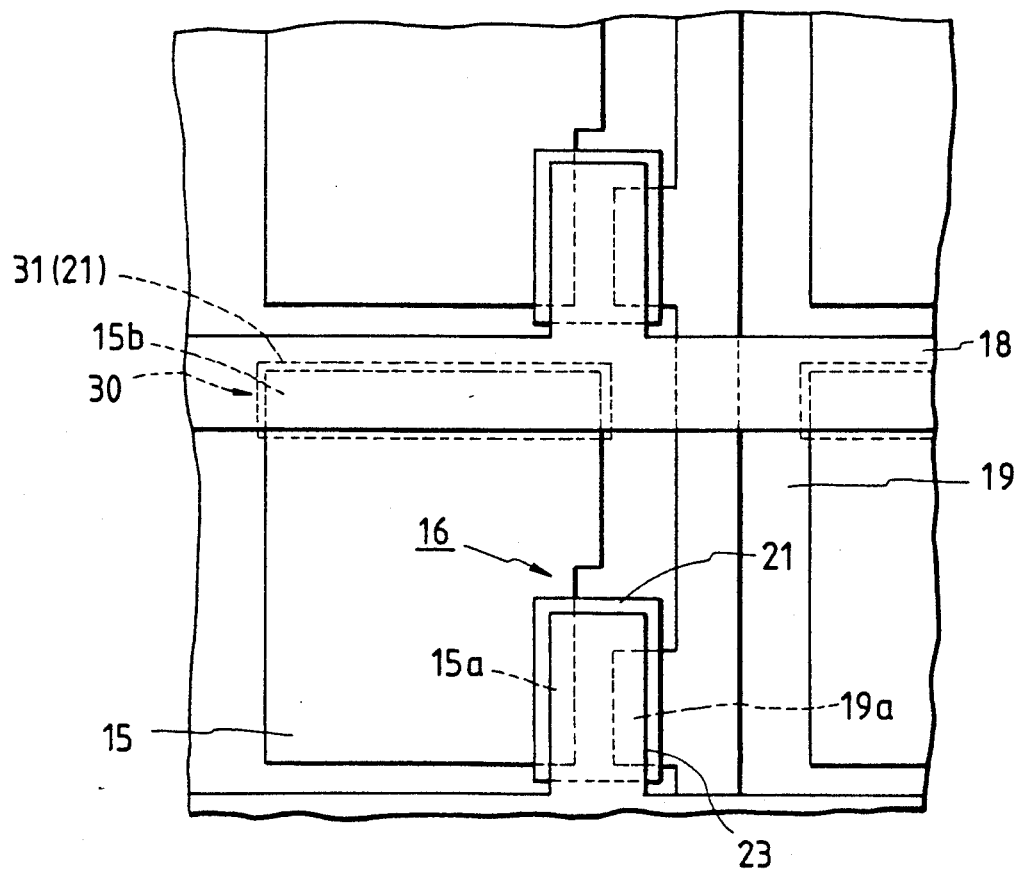

ACTIVE MATRIX DISPLAY DEVICE HAVING DIVIDED ADDITIONAL CAPACITORS

BACKGROUND OF THE INVENTION

The present invention relates to a liquid crystal display element and, more particularly, to the configuration of an additional capacitance region which is connected to its pixel electrodes.

FIG. 1 shows a conventional liquid crystal display element of a structure in which liquid crystal 14 is hermetically sealed in the space defined by a pair of opposed transparent substrates 11 and 12 as of glass with a spacer 13 interposed therebetween along their marginal edges. The one transparent substrate 11 has on its inside surface a plurality of pixel electrodes 15 each adjoined by a thin film transistor (hereinafter referred to as TFT) 16 serving as a switching element. The TFT 16 has its drain connected to the pixel electrode 15 corresponding thereto. The other transparent substrate 12 has on its inside surface a transparent common electrode 17 opposite the pixel electrodes 15.

As shown in FIG. 2, the pixel electrodes 15 substantially square in shape are closely arranged in rows and columns on the transparent substrate 11 and gate and source buses 18 and 19 extend adjacent and along the pixel electrodes 15 in the row and column directions, respectively. At each intersection of the gate and source buses 18 and 19 the TFT 16 is disposed, which has its gate connected to the gate bus 18, its source connected to the source bus 18 and its drain connected to the pixel electrode 15.

A voltage is applied across a pair of selected ones of the gate and source buses 18 and 19, the TFT 16 connected thereto at their intersection thus conducts to store charges in the pixel electrode 15 connected to the drain of the conducting TFT 16, and consequently, a voltage is applied across that portion of the liquid crystal 14 lying between the charged pixel electrode 15 and the common electrode 17 to make the liquid crystal 14 permit or inhibit the passage therethrough of light, thus providing a selective display. The display can be erased by discharging the charges stored in the pixel electrode 15.

FIG. 3 is an enlarged plan view showing one pixel and the neighboring portion in a conventional liquid crystal display element, FIG. 4 is a sectional view taken on the line IV—IV in FIG. 3, and FIG. 5 is a sectional view taken on the line V—V in FIG. 3. As shown in FIGS. 3 and 4, the pixel electrode 15 and the source bus 19 of ITO or similar transparent conductive material are formed on the transparent substrate 11, a semiconductor layer 21 as of amorphous silicon is formed which bridges a gap between parallel, opposed marginal portions of the pixel electrode 15 and the source bus 19, and the pixel electrode 15, the source bus 19 and the semiconductor layer 21 are covered with a gate insulating film 22 as of silicon nitride. On the gate insulating film 22 a gate electrode 23 is formed which overlaps the pixel electrode 15 and the source bus 19 through the semiconductor layer 21. The gate electrode 23 is connected at one end to the gate bus 18. Thus, those portions of the pixel electrode 15 and the source bus 19 which are opposite to the gate electrode 23 form a drain electrode 15a and a source electrode 19a, respectively. The electrodes 15a and 19a, the semiconductor layer 21, the gate insulating film 22 and the gate electrode 23 constitute the TFT 16. The gate electrode 23 and the gate bus 18 are simultaneously formed using aluminum, for instance. A protective layer 23 for the liquid crystal is formed on the gate electrode 23 over the entire area of the display screen.

As depicted in FIGS. 3 and 5, one marginal side portion of the pixel electrode 15 extends under the neighboring the gate bus 18 to substantially the center of the bus 18 widthwise thereof to form an additional capacitance region 30 between the extended portion 15b of the pixel electrode 15 and the gate bus 18. The additional capacitance region 30 is needed to supplement the electrostatic capacitance of the pixel electrode 15 to provide a large time constant composed of the electrostatic capacitance of the pixel electrode 15 and the resistance value of a channel region of the TFT 16.

The additional capacitance region 30 is composed of a plurality of divided capacitors. That is, the extended portion 15b of the pixel electrode 15 includes square electrodes 15b1, 15b2 and 15b3, each formed in the shape of an island under the gate bus 18 and connected to the pixel electrode 15 by a bridging segment 32. Electrostatic capacitances formed between the electrodes 15b1, 15b2 and 15b3 and the gate bus 18 are capacitors $C_1$, $C_2$ and $C_3$ depicted in FIG. 2. If in the additional capacitance region 30 a pinhole is made in or dust gets mixed into the gate insulating film 22 between the gate bus 18 and the underlying electrode 15b during manufacture, the insulation between the gate bus 18 and the electrode 15b may sometimes be impaired or shorting may develop therebetween. In such a case, some pixels in the display element always remain in the ON (lighted) state irrespective of an image signal to be displayed, resulting in the quality of the display being impaired. To avoid this, the defective additional capacitance region (i.e. defective one of the divided capacitors) is removed. That is, a focused laser beam is applied through the transparent substrate 12 in FIG. 1 and is brought into a focus 2 to 10 μm in diameter on the bridging segment 32 coupled wish the defective divided capacitor of the additional capacitance region 30 to cut the bridging segment 32 and hence cut the corresponding one of the electrodes 15b1, 15b2 and 15b3 off from the pixel electrode 15.

In the conventional liquid crystal display element, the removal of the defective divided capacitor of the additional capacitance region through laser cutting will reduce the capacitance value of the whole additional capacitance region to 2/3 its set value in the example of FIG. 3. This will cause the potential of the pixel electrode relative to the common electrode to change from its set value, introducing a change in the brightness of the pixel. This does not pose a serious problem in the case of producing a simple black-and-white display, but in the case of providing a high-grade, multi-gradation display, the gradation of the pixel changes, impairing the quality of the display.

SUMMARY OF THE INVENTION

It if therefore an object of the present invention to provide a liquid crystal display element which permits repairing bad insulation of the additional capacitance region with practically no reduction in its capacitance.

Another object of the present invention is to provide a liquid crystal display element which is designed to prevent bad insulation of the additional capacitance region.

According to an aspect of the present invention, one marginal side portion of each pixel electrode extends and partly lies under the neighboring gate bus and a gate insulating film coated uniformly all over the pixel electrodes and their extended portions underlies the gate bus to form an additional capacitance region between the extended portion of each pixel electrode and the corresponding gate bus. The extended portion of the pixel electrode forms a plurality of comb-tooth-like electrodes and at least one o them is partly cut away to form a gap between it and the pixel electrode. First and second electrodes for laser welding use are provided on the comb-tooth-like electrode and the pixel electrode opposite across the gap. The above-mentioned gate insulating film covers the first and second electrodes and fills the gap, and a third electrode for laser welding is provided on the gate insulating film above the first and second electrodes and the gap.

According to another aspect of the present invention, the pixel electrode has an extended portion underlying the neighboring gate bus, the extended portion is covered with a protective semiconductor layer formed between it and the gate bus, and the protective semiconductor layer is, in turn, covered with a reinforcing insulating film. The gate insulating film of a thin film transistor extends between the reinforcing insulating film and the gate bus.

BRIEF DESCRIPTION OF THE DRAWINGS

FIGS. 12A and 12B are plan view showing an extended portion 15b and its vicinity for explaining the effect produced by a thin bridging segment 32; and FIG. 13 is an enlarged plan view illustrating the principal part of still another embodiment of the present invention.

DESCRIPTION OF THE PREFERRED EMBODIMENTS

Figure 1:
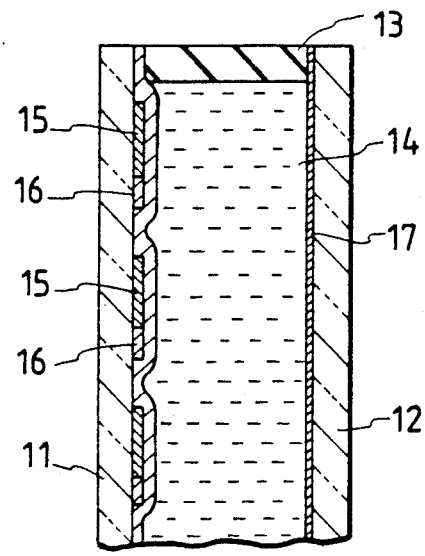
FIG. 1 is a sectional view showing a portion of a conventional liquid crystal display element.
Figure 2:
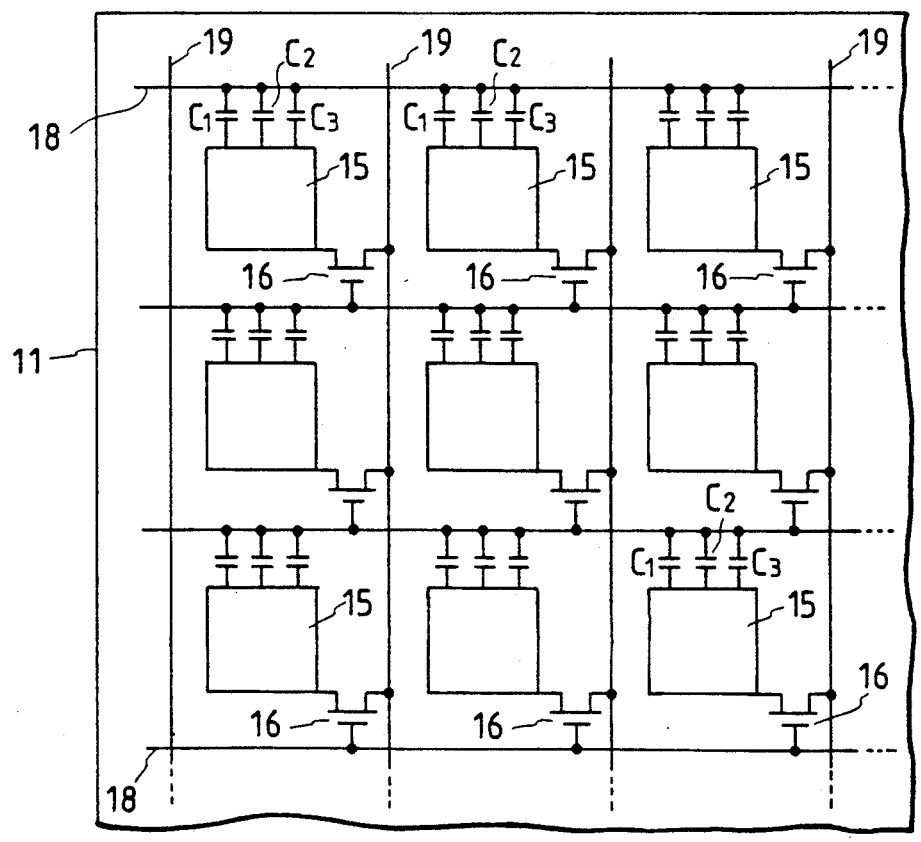
FIG. 2 is an equivalent circuit diagram of the conventional liquid crystal display element.
Figure 3:
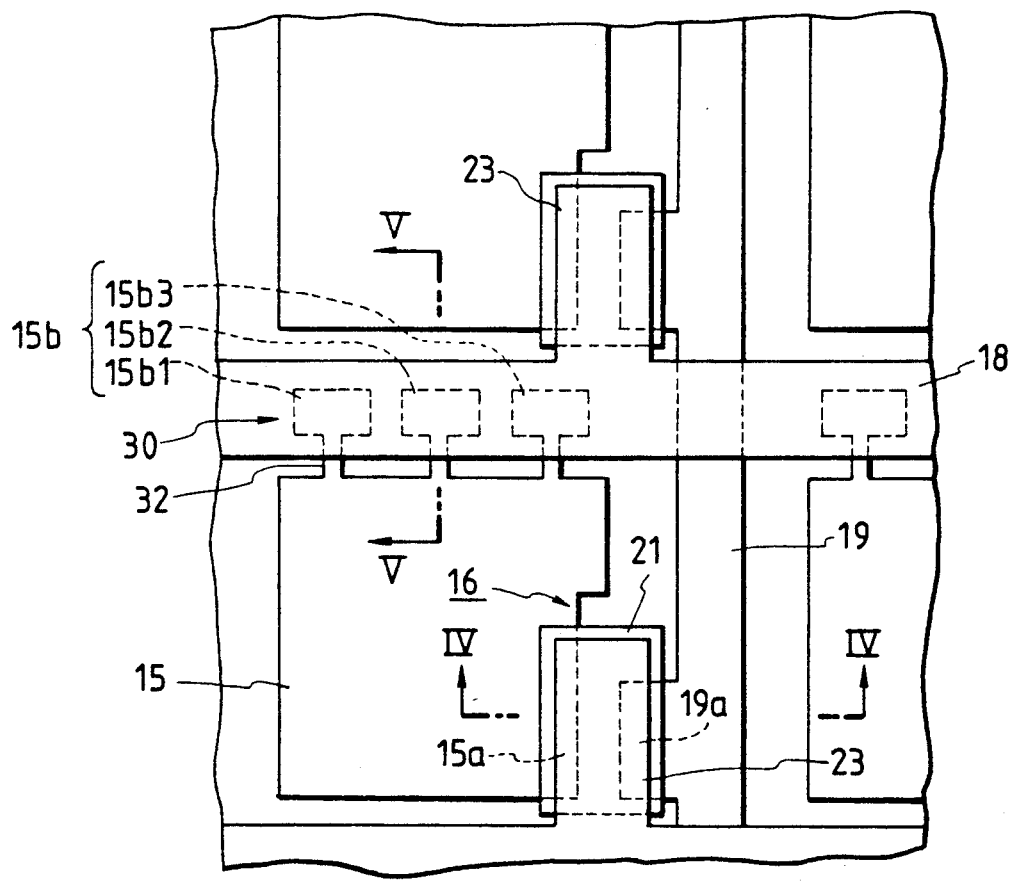
FIG. 3 is an enlarged plan view showing a pixel electrode and its vicinity of the conventional liquid crystal display element.
Figure 4:
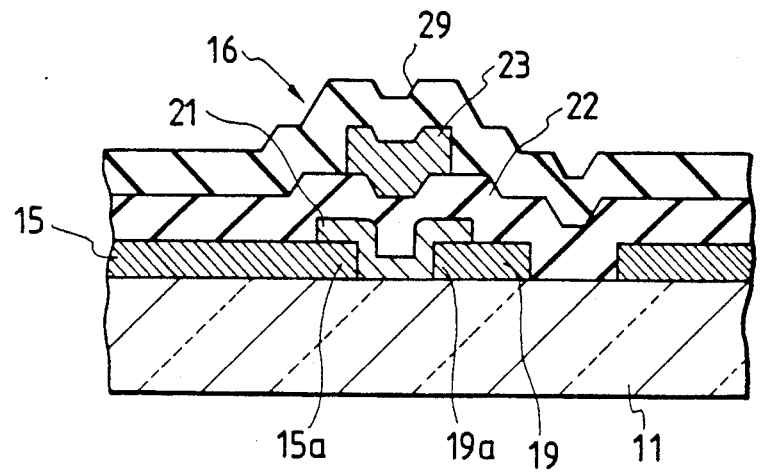
FIG. 4 is a sectional view taken on the line IV—IV in FIG. 3.
Figure 5:
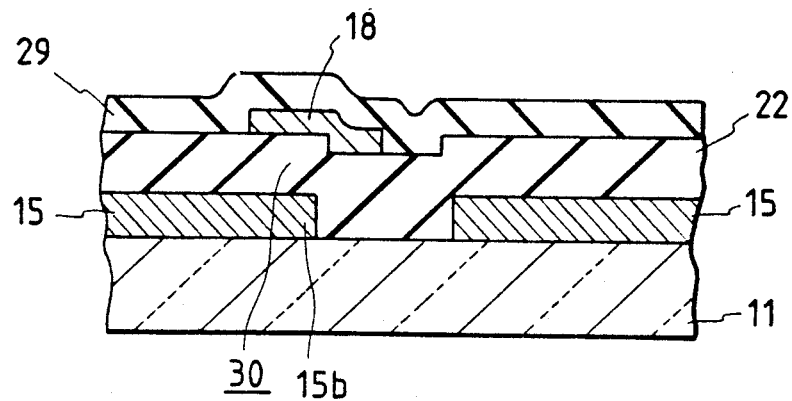
FIG. 5 is a sectional view taken on the line V—V in FIG. 3.
Figure 6A:
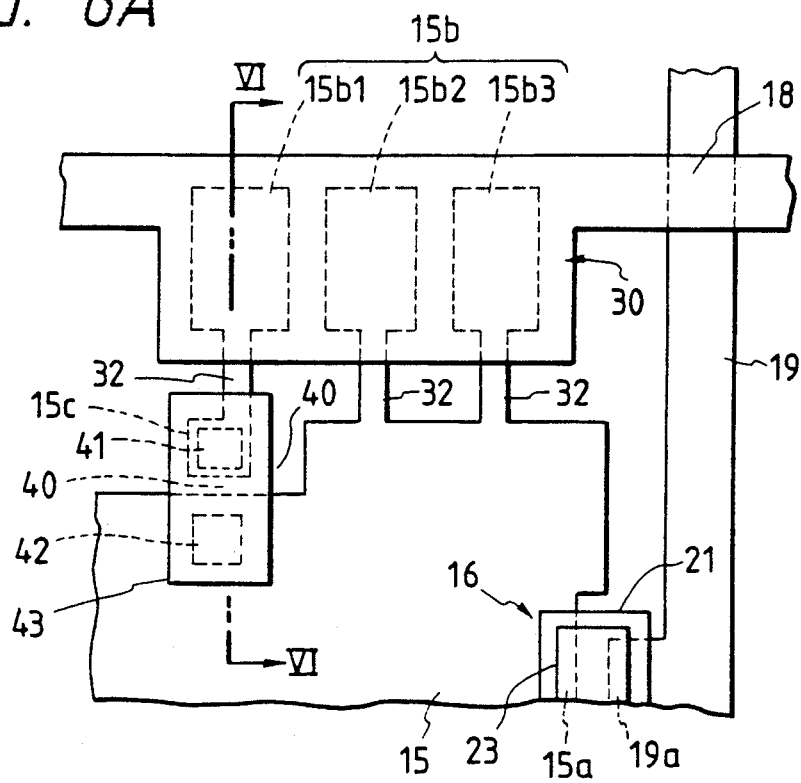
FIG. 6A is an enlarged plan view showing the principal part of an embodiment of the present invention.
Figure 6B:
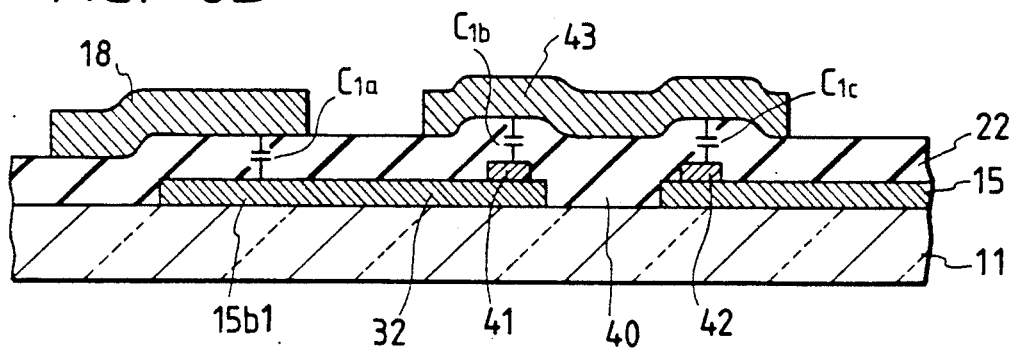
FIG. 6B is a sectional view taken on the line VI—VI in FIG. 6A.

Referring now to FIGS. 6A, 6B, 7, 8A and 8B, an embodiment of the present invention will be described. The parts corresponding to those in FIGS. 1 through 5 are identified by the same reference numerals and no detailed description will be repeated with respect to them. In this embodiment, as shown in FIGS. 6A and 6B, the bridging segment 32 of the comb-tooth-like electrode 15b1 has an islet 15c separated by a gap 40 from the pixel electrode 15. First and second electrodes 41 and 42 formed of a refractory metal (chromium, molybdenum, or the like) for laser welding use are provided on the islet 15c and the pixel electrode 15 facing each other across the gap 40. The refractory metal may be a well-known high-melting point material which is formed on the source bus for reducing its resistance value. The gate insulating film 22 is formed which covers the first and second electrodes 41 and 42 and fills the gap 40. A third electrode 43 for laser welding use is formed on the gate insulating film 22 in such a manner as to overlap the first and second electrodes 41 and 42 and the gap 40. The third electrode 43 is formed of the same material (aluminum, for instance) as that of the gate bus 18 and is patterned simultaneously with the gate bus 18.

Figure 7:
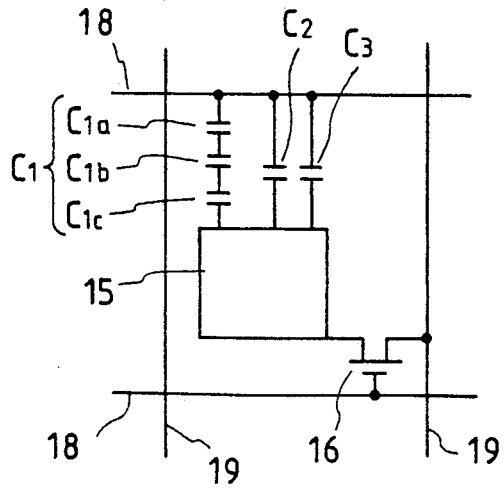
FIG. 7 is an electrical equivalent circuit diagram of the principal part surrounding a pixel electrode 15 in FIG. 6A.

A capacitor $C_{1a}$ is formed between the comb-tooth-like electrode $15b1$ and the gate bus 18. Capacitors $C_{1b}$ and $C_{1c}$ are formed between the first and third electrodes 41 and 43 and between the second and third electrodes 42 and 43, respectively. The three capacitors are connected in series as shown in FIG. 7. Utilizing the reference character of each capacitor for expressing its capacitance value, the following equation holds:

$$\frac{1}{C_1} = \frac{1}{C_{1a}} + \frac{1}{C_{1b}} + \frac{1}{C_{1c}} \quad (1)$$

Assuming, for the sake of brevity, that $$C_{1b} = C_{1c} \quad (2)$$

then, $$\frac{1}{C_1} = \frac{1}{C_{1a}} + \frac{1}{C_{1b}/2} \quad (3)$$

As in the prior art structure, the capacitors $C_2$ and $C_3$ are formed between the comb-tooth-like electrodes $15b2$ and $15b3$ and the gate bus 18. FIG. 7 shows an equivalent circuit of one pixel electrode 15 and capacitances connected thereto.

The electrostatic capacitance values of the capacitors $C_2$ and $C_3$ and also set to C for the sake of simplicity.

$$C_2 = C_3 = C \quad (4)$$

Figure 8A:
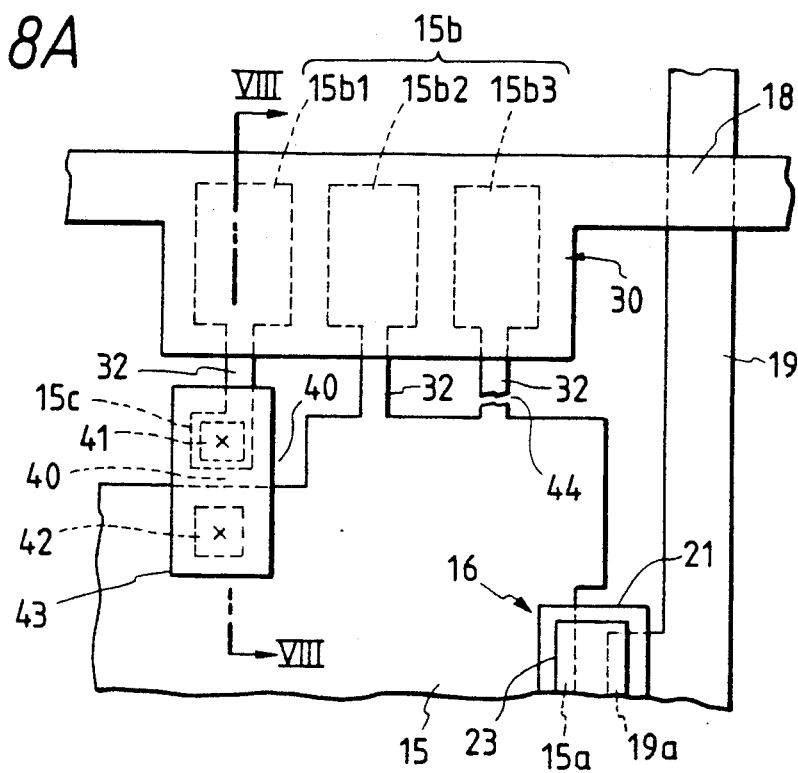
FIG. 8A is a plan view for explaining how to repair an additional capacitance in FIG. 6A.
Figure 8B:
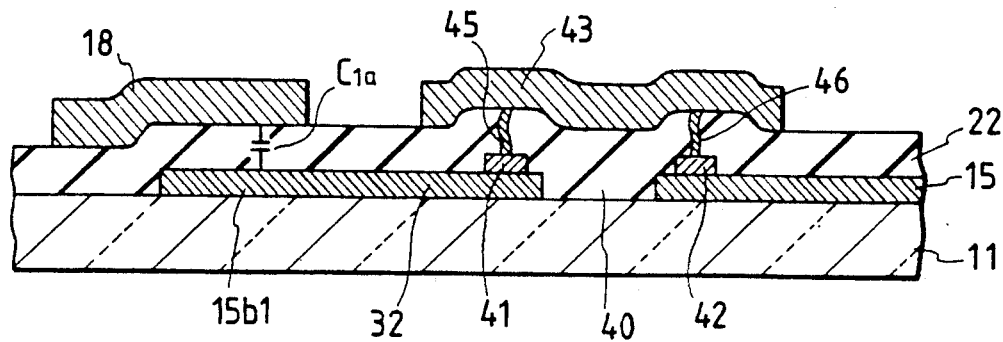
FIG. 8B is a sectional view taken on the line VIII—VIII in FIG. 8A.

Letting he whole additional capacitance value for the pixel electrode 15 be represented by $C_T$, it follows that $$C_T = C_1 + 2C \quad (5)$$

Where the capacitor $C_3$ is shorted, the bridging segment 32 of the comb-tooth-like electrode $15b3$ is severed by laser cutting in the vicinity of the pixel electrode 15 as indicated by 44 in FIG. 8A. Then, a laser beam from a laser welder is applied through the transparent substrate 12 or 11 to the third electrode 43 and the center (indicated by a cross in FIG. 8A) of each of the first and second electrodes 41 and 24 underlying it, by which the first and second electrodes 41 and 42 are electrically connected by fused metal as indicated by 45 and 46 in FIG. 8B. As a result of this, the capacitors $C_{1b}$ and $C_{1c}$ are shorted to provide a composite capacitance $C_1 = C_{1a}$ and the whole additional capacitance value becomes $C_T' = C + C_{1a}$. It is necessary that the whole additional capacitance $C_T' = C + C_{1a}$ after repair be set to a value nearly equal to the whole additional capacitance $C_T = C_1 + 2C$ in the normal state given by Eq. (5). That is, $$C_T' = C + C_{1a} \cong C_1 + 2C = C_T \quad (6)$$

On the other hand, when the capacitor $C_{1a}$ is shorted, the comb-tooth-like electrode $15b1$ is not severed but instead the additional capacitance value $C_T'' = C_{1b}/2 + 2C$ at that time must be set to a value substantially equal to the additional capacitance value $C_T$ in the normal state. That is, $$C_T'' = C_{1b}/2 + 2C \cong C_1 + 2C = C_T \quad (7)$$

From Eq. (7) it follows that $$C_1 \cong C_{1b}/2 \quad (8)$$

From Eqs. (8) and (3) it follows that $$C_{1a} \cong \infty \quad (9)$$

To approximately satisfy Eq. (8) in practice, it is necessary only that $$C_{1a} >> C_{1b}/2 \quad (9')$$

From Eq. (6) it follows that $$C_{1a} \cong C_1 + C \quad (6')$$

Substitution of Eq. (8) into Eq. (6') gives $$C_{1a} \cong C_{1b}/2 + C \quad (10)$$

To facilitate the understanding of the above, the invention will now be described more specifically. Setting $C_{1b} = 0.5$ pF, for example, it is necessary, from Eq. (9') that $C_{1a} >> 0.25$ pF. Setting $C = 1.0$ pF in view of Eq. (10), then $C_{1a} = 0.25 + 1.0 = 1.25$ pF 1.2 pF; thus, Eq. (9') can be satisfied by a rough approximation. Consequently, the capacitance $C_{1b}$, C and $C_{1a}$ are set to 0.5, 1.0 and 1.2 pF, respectively. From Eq. (8) the composite capacitance $C_1 = C_{1b}/2 = 0.25$ pF, but since the capacitance value of each of the above-said capacitors is approximate, the capacitance $C_1$ may preferably be obtained accurately from Eq. (3); namely, $$C_1 = \frac{C_{1a} \times C_{1b}/2}{C_{1x} + C_{1b}/2} = \frac{1.2 \times 0.25}{1.2 + 0.25} = 0.21 \text{ pF} \quad (11)$$

Further, the capacitance $C_T$, $C_T'$ and $C_T''$ obtained from Eqs. (5), (6) and (7), respectively, are as follows:

$$C_T = C_1 + 2C = 0.21 + 2 \times 1 = 2.21 \text{ pF} \quad (12)$$

$$C_T' = C + C_{1a} = 1 + 1.20 = 2.20 \text{ pF} \quad (13)$$

$$C_T'' = C_{1b}/2 \; 2C = 0.25 + 2 = 2.25 \text{ pF} \quad (14)$$

It is seen from the above that the additional capacitance $C_T'$ after repair and the additional capacitance $C_T''$ after shorting of the capacitor $C_{1a}$ are both substantially equal to the normal additional capacitance $C_T$.

To sum up, when the capacitances $C_{1b}$ and $C_{1c}$ are selected small enough to satisfy the following condition in FIG. 7

$$C_{1a} >> C_{1b} \cong C_{1c} \quad (15)$$

the composite capacitance $C_1$ of these three capacitances is substantially $C_{1b}/2$ and this value is about the same, even if the capacitor $C_1$ is shorted. Hence, if the capacitance $C_{1a}$ is selected substantially equal to the capacitance $C_2 (= C_3)$, then the total additional capacitance $C_T$ in the case where none of the capacitors $C_{1a}$, $C_2$ and $C_3$ is defective is about $2C_2 (= 2C_3)$. Also in the case where either one of the capacitors $C_2$ and $C_3$, for example, the latter $C_3$ is shorted, the total additional capacitance $C_T'$ is made nearly equal to the sum of the capacitances $C_{1a}$ and $C_2$, i.e. $2C_2$, by cutting off the capacitor $C_3$ through laser cutting and by shorting the capacitors $C_{1b}$ and $C_{1c}$ through laser welding.

While in the above the comb-tooth-like electrodes $15b1$, $15b2$ and $15b3$ each have the narrow bridging segment 32 leading to the pixel electrode 15, the present invention is not limited specifically to the comb-tooth-like electrodes of such a configuration; for example, rectangular comb-tooth-like electrodes with no narrow portion may also be used. The first through third electrodes may also be shaped as desired. The number of comb-tooth-like electrodes need not always be three but needs only to be plural. Besides, it is also possible to provide a plurality of sets of electrodes similar to the set of electrodes $15b1$, 41, 42 and 43.

As described above, in the case where either one of the divided additional capacitance regions $C_2$ or $C_3$ becomes of bad insulation, the bridging segment 32 of he defective capacitor is cut off by laser cutting, the first and second electrodes are electrically connected to the third electrode by laser welding and the additional capacitance $C_{1a}$ established between the comb-tooth-like electrode $15b1$ and the gate bus 18 is added, by which the additional capacitance value after repair can be made nearly equal to the normal additional capacitance value. Even if the additional capacitor $C_{1a}$ shorts, the total additional capacitance value is held substantially equal to the normal value, and hence no adjustment of capacitance is needed. Hence, in either case mentioned above the brightness of the corresponding pixel hardly change, permitting an excellent multi-gradation display.

Figure 9A:
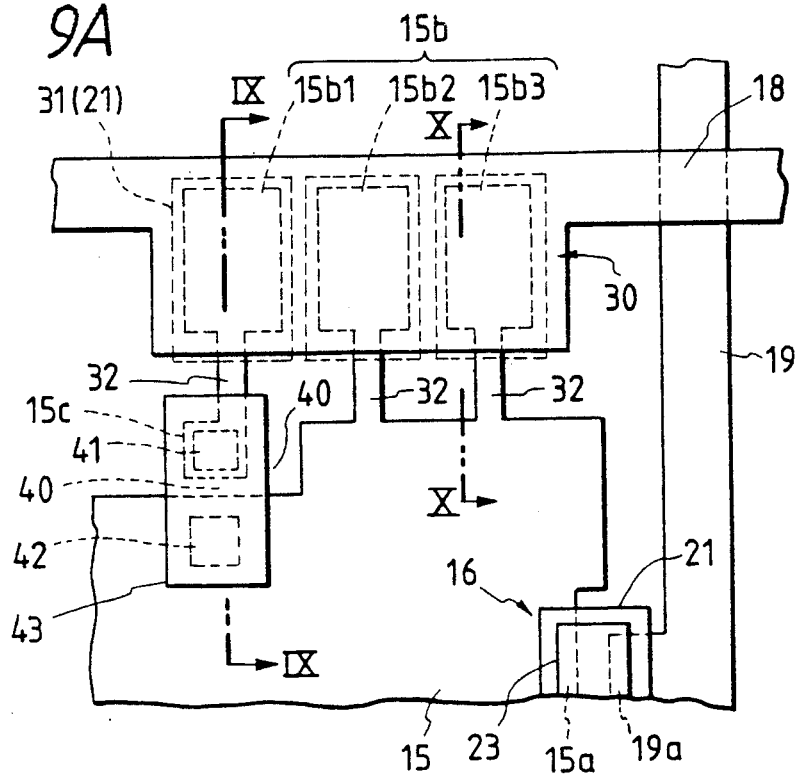
FIG. 9A is an enlarged plan view illustrating the principal part of another embodiment of the present invention.
Figure 9B:
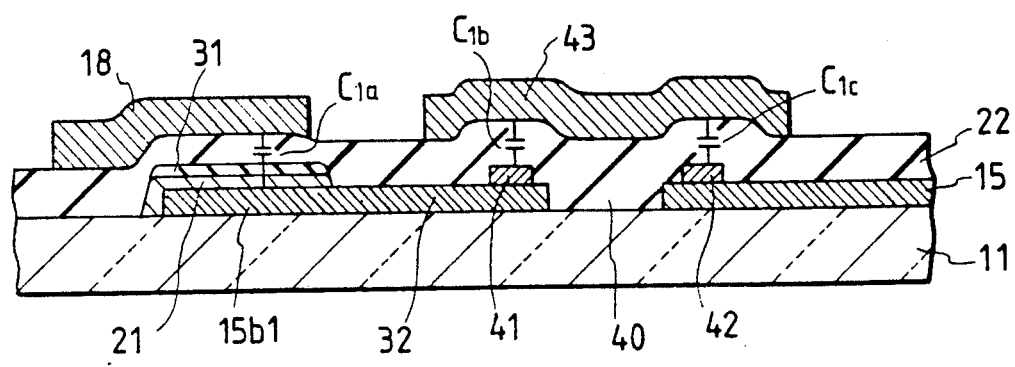
FIG. 9B is a sectional view taken on the line IX—IX in FIG. 9A.
Figure 10A:
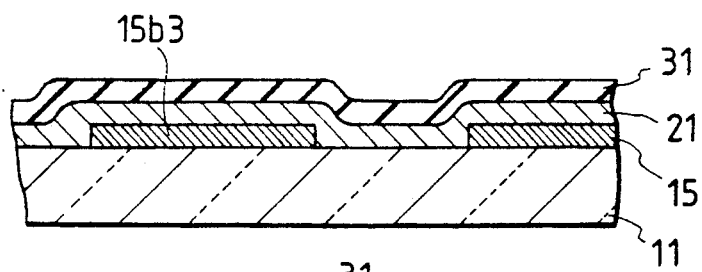
FIG. 10A is a sectional view showing a manufacturing step of the liquid crystal display element of the FIG. 9A embodiment.
Figure 10B:
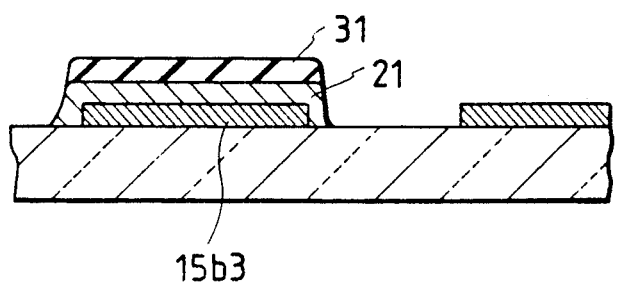
FIG. 10B is a sectional view showing another manufacturing step of the liquid crystal display element of the FIG. 9A embodiment.

Although the above embodiment has been described to take steps to deal with shorting between the extended portion $15b$ of the pixel electrode 15 and the gate bus 18 in the additional capacitance region 30, it is also important to employ a structure in which such shorting is difficult to occur. FIGS. 9A and 9B corresponding to FIGS. 8A and 8B, respectively show another embodiment in which the additional capacitance region 30 has a structure intended to prevent shorting. FIGS. 10A and 10B are sectional views taken on the line X—X in FIG. 9A, showing the additional capacitance region 30 and its vicinity during manufacture. In the embodiment depicted in FIGS. 9A and 9B a semiconductor layer 21 as of amorphous silicon for forming the TFT 16 is coated uniformly over the transparent substrate 11 on which there are deposited the pixel electrode 15, its extended portion 15b, the drain electrode 15a, the source bus 19 and the source electrode 19a, and then a reinforcing insulating film 31 as of silicon nitride is deposited on the semiconductor layer 21 (FIG. 10A). Then the additional capacitance region 30 and the semiconductor layer 21 and the reinforcing insulating film 31 of the TFT 16 are simultaneously patterned. Consequently, the TFT 16 also has the reinforcing insulating film 31 on the semiconductor layer 21. In this instance, the additional capacitance region 30 is patterned such that marginal portions of the semiconductor layer 21 and the reinforcing insulating film 31 protrude outwardly of the marginal edge of the extension 15b of the pixel electrode 15 to cover the electrodes 15b1, 15b2 and 15b3. Next, the gate insulating film 22 as of silicon nitride is formed uniformly over the substrate 11 and then the gate bus 18 and the gate electrode 23 of the TFT 16 are simultaneously formed on the gate insulating film 22 (FIG. 9B). As will be seen from FIG. 9B, the semiconductor layer 21, the reinforcing insulating film 31 and the gate insulating film 22 are sequentially formed between each of the electrodes 15b1, 15b2 and 15b3 and the gate bus 18 in the additional capacitance region 30, so that even if a pinhole is made in any one of the three layers, insulation is retained by the overlying or underlying layer. Unlike in the case of the conventional structure having only the gate insulating film 22, this embodiment is virtually free from the fear of bad insulation or shorting between the extended portion 15b of the pixel electrode 15 and the gate bus 18 owing to the influence of a pinhole or dust.

According to the embodiment shown in FIGS. 9A and 9B, the probability of shorting or bad insulation per unit area in the additional capacitance region 30 is reduced, as referred to above. On the other hand, by maximizing the number of divided capacitors into which the additional capacitance region 30 is divided the change in the total capacitance by the separation of the defective one of the divided capacitors can be made acceptably small. In such a case, the electrodes 41, 42 and 43 for laser welding use shown in FIG. 9A need not be provided as depicted in FIG. 11, in which the parts corresponding to those in FIG. 9A are identified by the same reference numerals.

In the embodiment of FIG., 11 the additional capacitance region 30 is divided into four portions. The comb-tooth-like electrodes 15b1 through 15b4 of the extension 15b forming the respective additional capacitance regions are covered with an island-like common laminated structure composed of the semiconductor layer 21 and the reinforcing insulating film 31, and the electrodes are each connected to the pixel electrode 15 via the thin bar-shaped bridging segment 32.

With such a structure in which the additional capacitance region is divided into a plurality of portions as mentioned above, even if only a defective one of the divided capacitance portions is selectively cut off from the others, a decrease in the total additional capacitance can be made small within a given limit range, providing the operating margin of the TFT against a temperature change.

Figure 11:
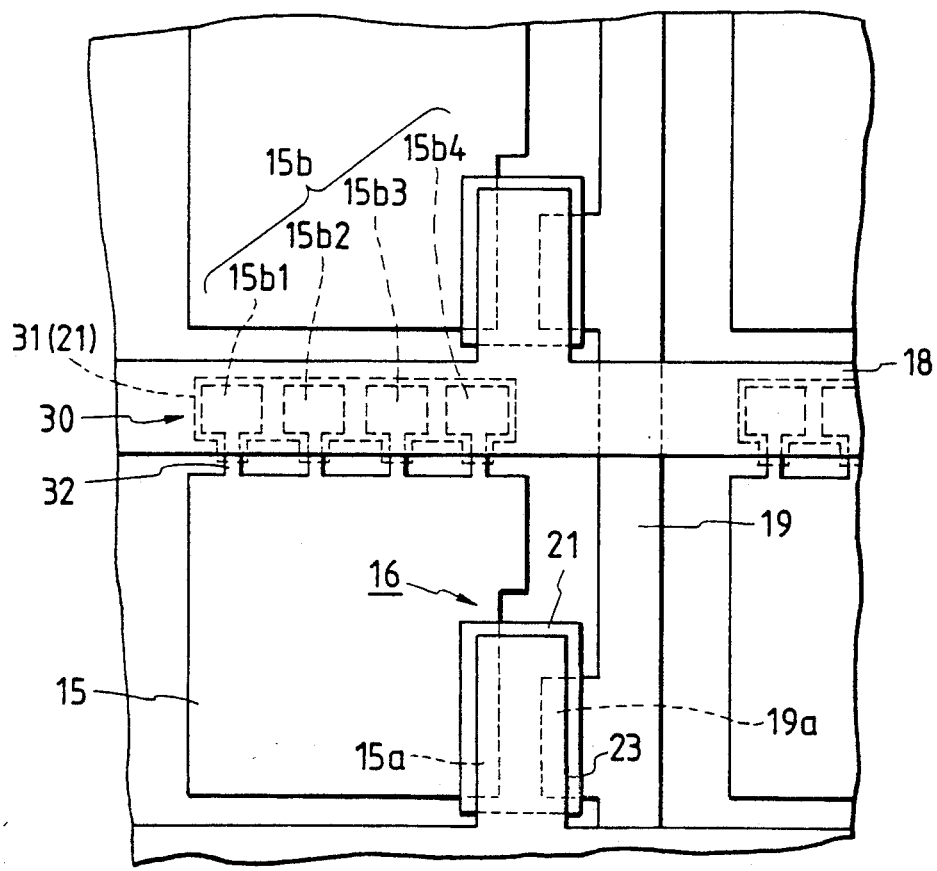
FIG. 11 is an enlarged plan view illustrating the principal part of another embodiment of the present invention.

In the embodiment of FIG. 11, since the removal of a desired one of the divided capacitance portions can be accomplished simply by cutting the narrow bridging segment 32, the time therefore is short. Further, even if a patterning error occurs between the gate bus 18 and each extended portion 15b as depicted in FIGS. 12A and 12B, their overlapping area hardly change, and hence the entire additional capacitance value undergoes substantially no change. The same results are also obtainable with the FIG. 8 embodiment. FIG. 12A shows the case where no patterning error is present between the gate bus 18 and the extended portion 15b and FIG. 12B shows the case where the gate bus 18 is shifted upwardly relative to the extended portion 15b. If the bridging segment 32 of each of the divided additional capacitance portions is not constricted in a narrow stripe form, the overlapping area of the divided extended portion 15b and the gate bus 18 in the case of FIG. 12B is appreciably small compared to the case in FIG. 12A. and hence the capacitance value is also small.

If the FIG. 11 embodiment can be made substantially free from defects such as shorting, by forming the semiconductor layer 21 and the reinforcing insulating film 31 between the extended portion 15b of each additional capacitance region 30 and the gate bus 18 as mentioned above, then the additional capacitance region 30 need not be divided. FIG. 13 illustrates an embodiment of such a structure. In this embodiment one marginal side portion of the pixel electrode 15 extends under the gate bus 18 to form the extended portion 15b, over which the semiconductor layer 21 and the reinforcing insulating film 31 are deposited in the shape of an island as in the case of FIG. 11, and they are covered with the gate insulating film 22 (see FIG. 9B).

Since the additional capacitance region 30 has, between the extended portion 15b and the gate bus 18, the three-layer structure composed of the semiconductor layer 21, the reinforcing insulating film 31 and the gate insulating film 21 as mentioned above, the possibility of bad insulation by a pinhole or dust can be reduced remarkably. With the structure in which the additional capacitance region is divided into a plurality of regions, when bad insulation occurs in any one of them, a decrease in the electrostatic capacitance can be suppressed by selectively cutting oil the defective capacitance region.

With the structure in which each of the divided additional capacitance region 30 is formed in the shape of an island under the gate bus 18 its intermediate portion widthwise thereof and is connected to the pixel electrode 15 by the bridging segment 32, the time for laser cutting the defective capacitance region can be reduced markedly. Moreover, it is also possible to suppress a variation in the additional capacitance which is caused by a patterning error between the extended portion 15b and the gate bus 18.

It will be apparent that many modifications and variations may be effected without departing from the scope of the novel concepts of the present invention.

What is claimed is:

1. A liquid crystal display device comprising:
a transparent substrate:
a plurality of source buses and a plurality of gate buses formed on said transparent substrate at regular intervals in directions perpendicular to each other;
thin film transistors, each connected to said source bus and said gate bus at their intersection and formed at one corner in a mesh-like area defined by said source and gate buses;

pixel electrodes, each connected to a drain electrode of said thin film transistor and formed in said mesh-like area, said pixel electrode having an extended portion underlying said gate bus;

a gate insulating film formed uniformly over said pixel electrode and its extended portion and in contact with the underside of said gate bus; and an additional capacitance region formed between said extended portion of said pixel electrode and said gate bus opposed thereto;

wherein said extended portion of said pixel electrode is formed by a plurality of comb-tooth-like electrodes;

wherein at least one of said comb-tooth-like electrodes is separated by a gap from said pixel electrode;

wherein first and second electrodes for laser welding use are formed on said one of said comb-tooth-like electrode and said pixel electrode facing each other across said gap; said gate insulating film covering said first and second electrodes and filling said gap; and wherein a third electrode for laser welding use is formed on said gate insulating film and overlaps said first and second electrodes and said gap, said third electrode defining first and second capacitances between it and said first and second electrodes.

2. The liquid crystal display device of claim 1, wherein each of said comb-tooth-like electrodes has a bridging segment extending from its one end to said pixel electrode and narrower than said comb-tooth-like electrode body, said bridging segment extending from said at least one comb-tooth-like electrode has said first electrode on its one end portion facing said pixel electrode across said gap, and said bridging segments of the other remaining comb-tooth-like electrodes are connected to said pixel electrode.

3. The liquid crystal display device of claim 1, wherein divided capacitors defined between said comb-tooth-like electrodes and said gate bus have about the same values, and said first and second capacitances have smaller values than said divided capacitors.

4. The liquid crystal display device of claim 1, wherein there are formed between said comb-tooth-like electrodes and said gate bus a protective semiconductor laYer covering said comb-tooth-like electrodes and a reinforcing insulating film formed on said protective semiconductor layer and covering said comb-tooth-like electrodes.

5. The liquid crystal display device of claim 1, 2, 3, or 4, wherein said third electrode and said gate bus are simultaneously formed of the same metal.

* * * * *